US012586249B2

(12) United States Patent
Kawano

(10) Patent No.: US 12,586,249 B2
(45) Date of Patent: Mar. 24, 2026

(54) PROCESSING APPARATUS, PROCESSING METHOD, AND STORAGE MEDIUM FOR CALIBRATING AN IMAGE CAPTURE APPARATUS

(71) Applicant: CANON KABUSHIKI KAISHA, Tokyo (JP)

(72) Inventor: Kyosuke Kawano, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 411 days.

(21) Appl. No.: 18/068,590

(22) Filed: Dec. 20, 2022

(65) Prior Publication Data

US 2023/0206502 A1 Jun. 29, 2023

(30) Foreign Application Priority Data

Dec. 24, 2021 (JP) ................................. 2021-210690

(51) Int. Cl.
*G06T 7/80* (2017.01)
*G02B 13/06* (2006.01)
*G06T 1/00* (2006.01)

(52) U.S. Cl.
CPC .............. *G06T 7/85* (2017.01); *G06T 1/0007* (2013.01); *G02B 13/06* (2013.01); *G06T 2207/10012* (2013.01)

(58) Field of Classification Search
None
See application file for complete search history.

(56) References Cited

U.S. PATENT DOCUMENTS

| | | | | |
|---|---|---|---|---|
| 7,196,721 B2 * | 3/2007 | Uchiyama | ................. | G06T 7/80 |
| | | | | 348/E17.002 |
| 7,479,982 B2 * | 1/2009 | Otani | ..................... | G01C 11/06 |
| | | | | 348/51 |
| 2003/0151665 A1 * | 8/2003 | Uchiyama | ................. | G06T 7/80 |
| | | | | 348/E17.002 |
| 2017/0039881 A1 * | 2/2017 | Belch | ................... | G11B 27/105 |
| 2017/0272708 A1 * | 9/2017 | Liu | ....................... | H04N 25/706 |
| 2023/0206502 A1 * | 6/2023 | Kawano | ................... | G06T 7/85 |
| | | | | 382/154 |

FOREIGN PATENT DOCUMENTS

| | | | | | |
|---|---|---|---|---|---|
| EP | 3547682 B1 * | 5/2024 | .......... | H04N 13/239 |
| JP | 2003-244521 A | 8/2003 | | |

* cited by examiner

*Primary Examiner* — Tahmina N Ansari
(74) *Attorney, Agent, or Firm* — Venable LLP

(57) ABSTRACT

A processing apparatus for calibrating an image capture apparatus having a first optical system, a second optical system, and an image capture sensor, each of the first and second optical systems including a wide-angle lens next to each other. The processing apparatus including an obtainment unit configured to obtain a first image acquired by image capture based on a light beam passing through the first optical system using the image capture sensor, the first image including a part of the second optical system, and a determination unit configured to determine, based on the part of the second optical system included in the first image, a first calibration parameter for calibrating the first optical system according to a deviation from a reference value related to the first optical system or the image capture sensor.

17 Claims, 15 Drawing Sheets

START

S1001

OBTAIN FIRST IMAGE AND IMAGE CAPTURE PARAMETER
FOR FIRST IMAGE

S1002

DETECT IMAGE OF SECOND OPTICAL SYSTEM FROM
FIRST IMAGE AND DETERMINE FIRST CALIBRATION PARAMETERS

S1003

OUTPUT FIRST CALIBRATION PARAMETERS

END

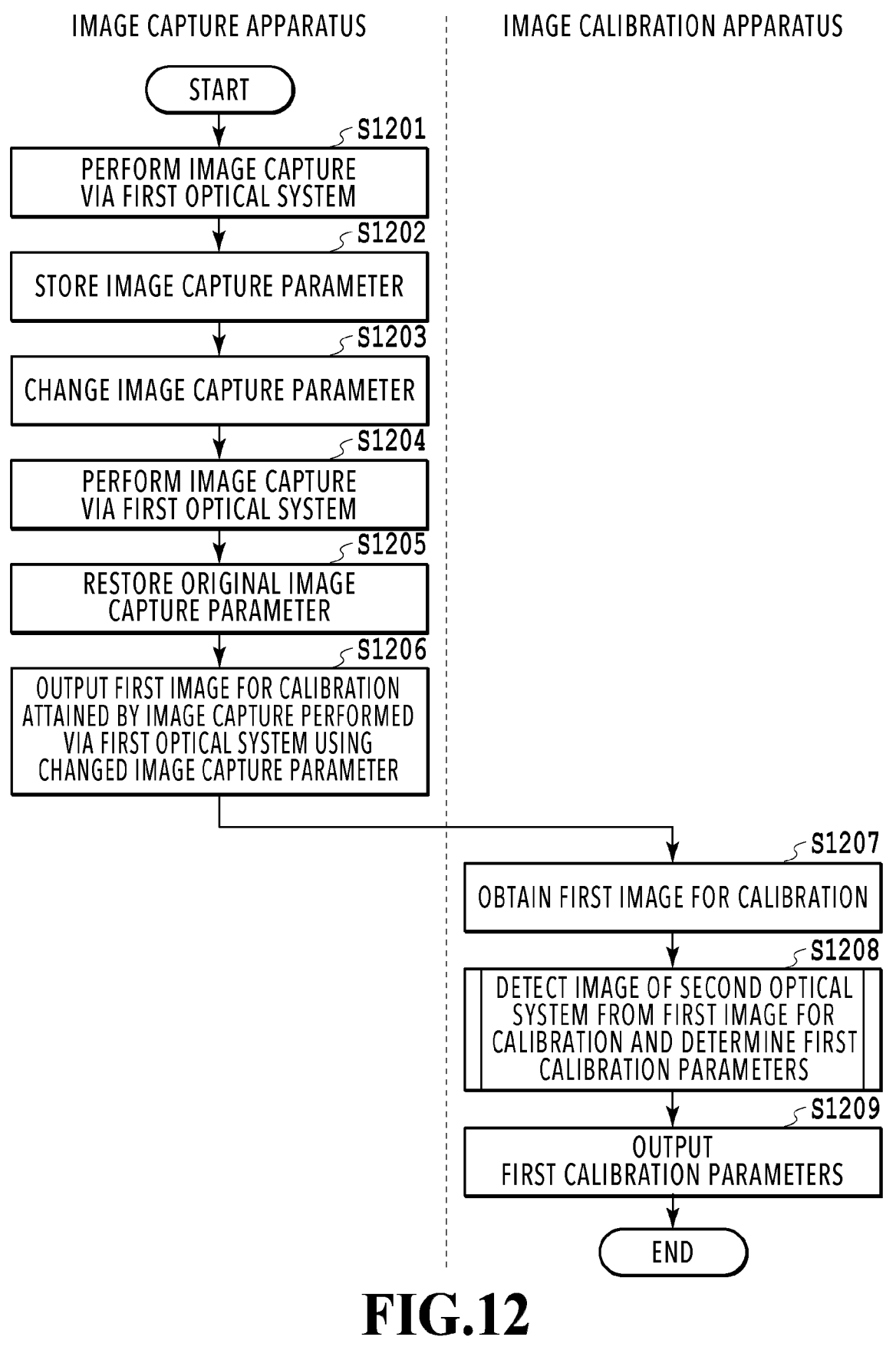

IMAGE CAPTURE APPARATUS       IMAGE CALIBRATION APPARATUS

START

S1201
PERFORM IMAGE CAPTURE
VIA FIRST OPTICAL SYSTEM

S1202
STORE IMAGE CAPTURE PARAMETER

S1203
CHANGE IMAGE CAPTURE PARAMETER

S1204
PERFORM IMAGE CAPTURE
VIA FIRST OPTICAL SYSTEM

S1205
RESTORE ORIGINAL IMAGE
CAPTURE PARAMETER

S1206
OUTPUT FIRST IMAGE FOR CALIBRATION
ATTAINED BY IMAGE CAPTURE PERFORMED
VIA FIRST OPTICAL SYSTEM USING
CHANGED IMAGE CAPTURE PARAMETER

S1207
OBTAIN FIRST IMAGE FOR CALIBRATION

S1208
DETECT IMAGE OF SECOND OPTICAL
SYSTEM FROM FIRST IMAGE FOR
CALIBRATION AND DETERMINE FIRST
CALIBRATION PARAMETERS

S1209
OUTPUT
FIRST CALIBRATION PARAMETERS

END

FIG.12

PROCESSING APPARATUS, PROCESSING METHOD, AND STORAGE MEDIUM FOR CALIBRATING AN IMAGE CAPTURE APPARATUS

CROSS REFERENCE TO PRIORITY APPLICATION

This application claims the benefit of Japanese Patent Application No. 2021-210690 filed Dec. 24, 2021, which is hereby incorporated by reference herein in its entirety.

BACKGROUND OF THE DISCLOSURE

Field of the Disclosure

The present disclosure relates to calibration of an image capture apparatus.

Description of the Related Art

There is a method for generating virtual reality (VR) images or measuring distances using a plurality of parallax images obtained by image capture using an image capture apparatus having a plurality of optical systems or using a plurality of image capture apparatuses. To properly generate a VR image or to measure a distance, the positional relation of the optical systems or the image capture apparatus relative to the world coordinate system needs to be calibrated.

Japanese Patent Laid-Open No. 2003-244521 describes a method for setting intrinsic or extrinsic parameters of a camera by placing a particular calibration pattern.

For example, in an unfixed image capture apparatus having a plurality of optical systems like an image capture apparatus held by a hand to perform image capture, its tilt changes in every image capture, and, thus, the calibration may need to be performed after every image capture. In such a case, when calibration is needed after every image capture, the method of Japanese Patent Laid-Open No. 2003-244521 requires placement of a calibration pattern for every image capture, requiring work on the part of a user.

SUMMARY OF THE DISCLOSURE

A processing apparatus of the present disclosure is a processing apparatus for calibrating an image capture apparatus having a first optical system, a second optical system, and an image capture sensor, the first and second optical systems including a wide-angle lens, the processing apparatus comprising an obtainment unit configured to obtain a first image acquired by image capture based on a light beam passing through the first optical system using the image capture sensor, and a determination unit configured to determine, based on an image of the second optical system included in the first image, a first calibration parameter for calibrating the first optical system according to a deviation from a reference value related to the first optical system or the image capture sensor.

Further features of the present disclosure will become apparent from the following description of exemplary embodiments with reference to the attached drawings.

BRIEF DESCRIPTION OF THE DRAWINGS

FIG. 12 is a flowchart showing processing performed by the image capture apparatus and the image calibration apparatus;

DESCRIPTION OF THE EMBODIMENTS

Based on embodiments, details of the technique of the present disclosure are described below with reference to the drawings attached hereto. The following embodiments merely show specific examples to carry out the technique of the present disclosure and are not intended to be interpreted as limiting the technique scope of the present disclosure. The technique of the present disclosure can be carried out in various ways without departing from the technical concept thereof or main features thereof.

Embodiment 1

A lens of an image capture apparatus or an image capture sensor that receives a light beam through the lens may be deviated from its designed relative position due to thermal expansion, oscillation, and the like. There is a method for calibrating the influence by the deviation using calibration parameters. In the present embodiment, a description is given of a method for determining calibration parameters for an image capture apparatus 101, which is a stereo camera equipped with two fisheye lenses as optical systems.

[Configuration of the Image Capture Apparatus]

Figure 1A:
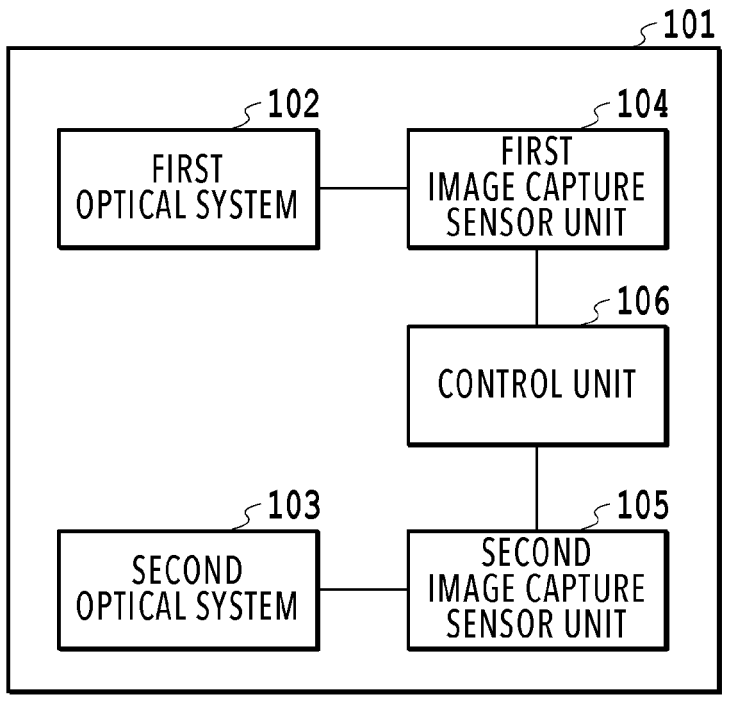
FIGS. 1A and 1B are diagrams showing the configuration of an image capture apparatus.
Figure 1B:
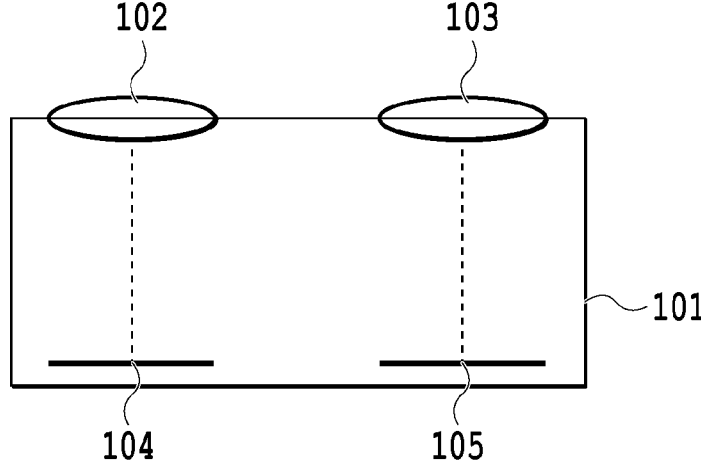

FIGS. 1A and 1B are diagrams illustrating the configuration of the image capture apparatus 101 of the present embodiment. FIG. 1A is a logical configuration diagram of the image capture apparatus 101. FIG. 1B is a physical configuration diagram of the image capture apparatus 101. The image capture apparatus 101 has a first optical system 102, a second optical system 103, a first image capture sensor unit 104, a second image capture sensor unit 105, and a control unit 106.

The first optical system 102 and the second optical system 103 are each, for example, a lens, but may additionally include a mirror, a prism, or a casing. For example, for use as a stereo camera, the first optical system 102 and the second optical system 103 are situated in parallel as shown in FIG. 1B. Using wide-angle lenses as the lenses for the first optical system 102 and the second optical system 103 allows an image captured by a certain one of the optical systems (e.g., the first optical system 102) to include an image of part of the other one of the optical systems (e.g., the second optical system 103) situated immediately next to the certain one of the optical systems. A wide-angle lens is a lens with an angle of view of, for example, 180° or above (±90° or above from the optical axis). However, the orientations and the angles of view of the first optical system 102 and the second optical system 103 are not limited, as long as the first optical system 102 and the second optical system 103 are situated such that through each or one of the optical systems, an image of part of the other optical system can be taken.

The first image capture sensor unit 104 receives a light beam passing through the first optical system 102. A CMOS/CCD image sensor is commonly used.

The second image capture sensor unit 105 receives a light beam passing through the second optical system 103. The second image capture sensor unit 105 may be implemented by the same image sensor as the first image capture sensor unit 104 or a different image sensor from the first image capture sensor unit 104.

The control unit 106 is implemented by, for example, a CPU or a microcomputer and software, and controls the operations of the first image capture sensor unit 104 and the second image capture sensor unit 105. For example, for use as a stereo camera, the control unit 106 performs control so that the two image capture sensors, namely the first image capture sensor unit 104 and the second image capture sensor unit 105, start capturing images in synchronization.

Note that herein, unless otherwise noted, an image obtained by image capture based on a light beam passing through the first optical system is referred to as a first image, and an image obtained by image capture based on a light beam passing through the second optical system is referred to as a second image.

[Configuration of the Image Calibration Apparatus]

Figure 2A:
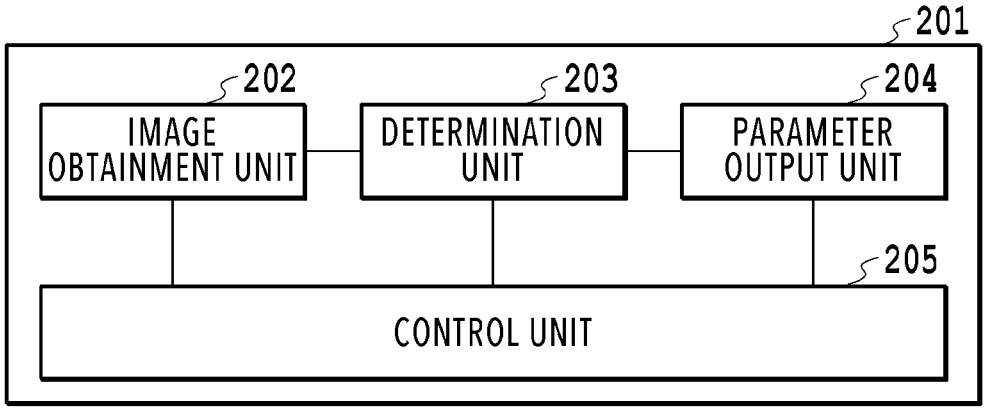
FIGS. 2A and 2B are diagrams showing the configuration of an image calibration apparatus.
Figure 2B:
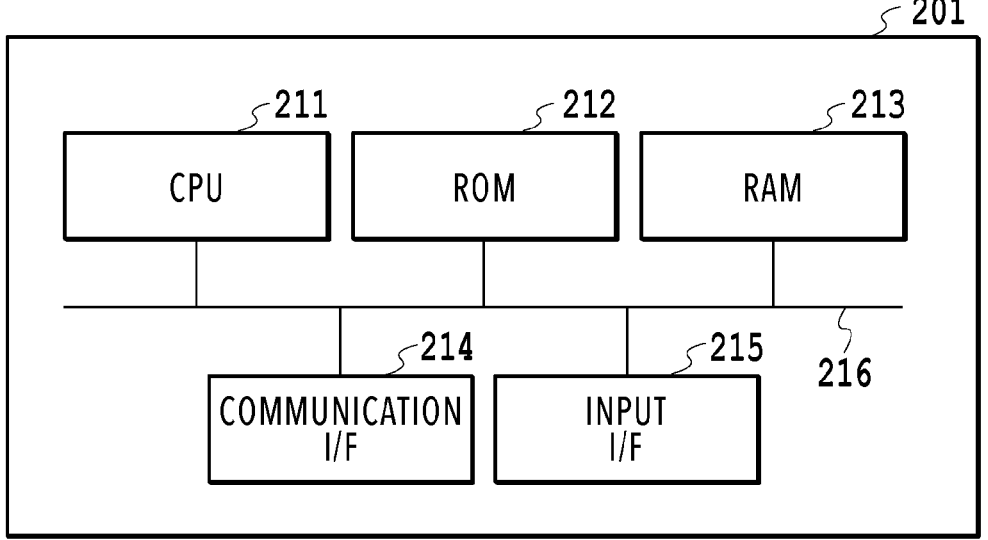

FIGS. 2A and 2B are diagrams illustrating the configuration of an image calibration apparatus 201, which is a processing apparatus that determines calibration parameters for the image capture apparatus 101. FIG. 2A is a diagram showing the functional configuration of the image calibration apparatus 201. The image calibration apparatus 201 has an image obtainment unit 202, a determination unit 203, a parameter output unit 204, and a control unit 205.

The image obtainment unit 202 obtains a first image or a second image acquired by image capture by the image capture apparatus 101. For example, the image calibration apparatus 201 is connected to the image capture apparatus 101 in a wired or wireless manner, and the image obtainment unit 202 receives data on a first image or a second image transmitted from the image capture apparatus 101. Alternatively, for example, the image calibration apparatus 201 may have a nonvolatile memory reader, and the image obtainment unit 202 may obtain data on a first image or a second image by reading a flash memory card having the data recorded by the image capture apparatus 101. In a case when the image calibration apparatus 201 has a nonvolatile memory reader, the image calibration apparatus 201 does not need to be connected to the image capture apparatus 101.

The determination unit 203 determines first calibration parameters, which are calibration parameters for performing calibration for the first optical system 102 or the first image capture sensor unit 104 based on an image of the second optical system 103 included in the first image. Similarly, the determination unit 203 may determine second calibration parameters, which are calibration parameters for performing calibration for the second optical system 103 or the second image capture sensor unit 105. Details will be described later.

The parameter output unit 204 outputs the calibration parameters determined by the determination unit 203. The control unit 205 controls the operation of the image calibration apparatus 201.

FIG. 2B is a diagram showing the hardware configuration of the image calibration apparatus 201. The image calibration apparatus 201 has a CPU 211, a ROM 212, a RAM 213, an input I/F 215, a communication I/F 214, and a bus 216.

The CPU 211 implements the functions of the image calibration apparatus 201 shown in FIG. 2A by performing overall control of the image calibration apparatus 201 using computer programs and data stored in the ROM 212 and the RAM 213. Note that the image calibration apparatus 201 may include one piece or a plurality of pieces of dedicated hardware different from the CPU 211 and may be configured such that the dedicated hardware executes at least part of the processing performed by the CPU 211. Examples of the dedicated hardware include a processor used for image processing or control, an application-specific integrated circuit (ASIC), a field-programmable gate array (FPGA), and a digital signal processor (DSP).

The ROM 212 stores programs, and the like, that do not need to be changed. The RAM 213 temporarily stores programs and data supplied from the ROM 212 and used to implement the functional blocks, data supplied from the outside via the communication I/F 214, and the like. The input I/F 215 is a reception unit such as an SDI or an HDMI (registered trademark). A first image or a second image may be obtained via the input I/F 215.

The communication I/F 214 is used for communications with the image capture apparatus 101. For example, in a case when the image calibration apparatus 201 is connected to the image capture apparatus 101 in a wired manner, a communication cable is connected to the communication I/F 214, and, in a case when the image calibration apparatus 201 has a wireless communication function, the communication I/F 214 includes an antenna. The bus 216 connects the units of the image calibration apparatus 201 to communicate information.

In addition to the above, there may be at least one of a display unit and an operation unit as a different external apparatus. The display unit may be formed of, for example, a liquid crystal display, an LED, or the like, and display, e.g., a graphical user interface (GUI) for a user to operate the image calibration apparatus 201. The operation unit is formed by, for example, a keyboard, a mouse, a joystick, a touch panel, and/or the like, and inputs various kinds of instructions to the CPU 211 in response to user operations. The CPU 211 operates as a display control unit to control the display unit and as an operation control unit to control the operation unit.

Note that, in the present embodiment, the image capture apparatus 101 and the image calibration apparatus 201 are described as being different apparatuses from each other. An alternative configuration may be employed such that the image calibration apparatus 201 is incorporated as part of the image capture apparatus 101 or that the image capture apparatus 101 is incorporated as part of the image calibration apparatus 201. In such cases, the hardware of the image capture apparatus 101 may be used for each hardware configuration shown in FIG. 2B.

[Operation Flow of the Image Calibration Apparatus]

Figure 3:
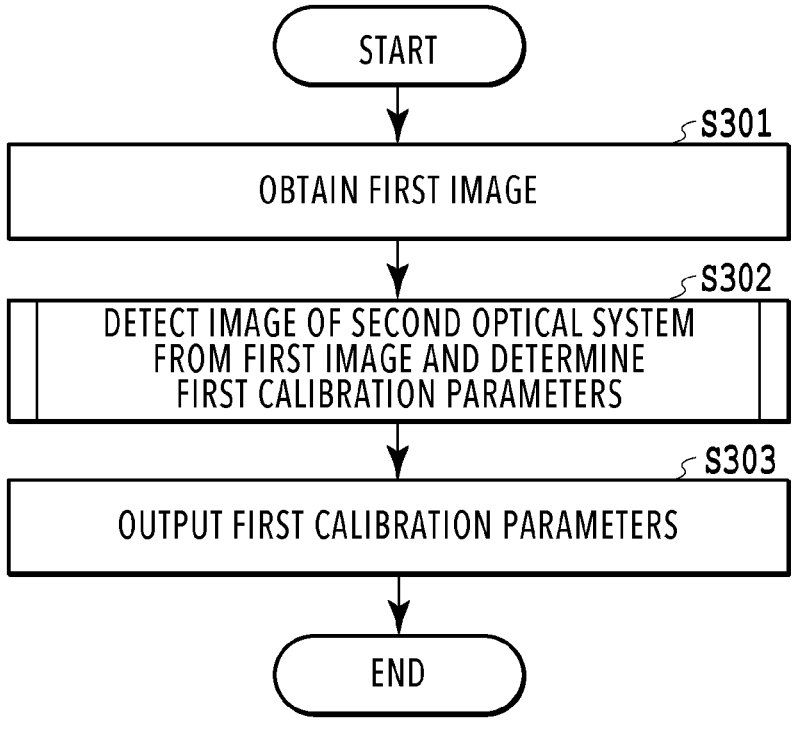
FIG. 3 is a flowchart showing processing performed by the image calibration apparatus.

FIG. 3 is a flowchart illustrating an example of first calibration parameter determination processing performed by the image calibration apparatus 201. The series of processes shown in the flowchart in FIG. 3 is performed by the CPU 211 of the image calibration apparatus 201 by loading program code stored in the ROM 212 into the RAM 213 and executing the program code. Also, some or all of the functions in the steps in FIG. 3 may be implemented by hardware such as an ASIC or an electronic circuit. Note that the letter "S" in the description of each process means that it is a step in the flowchart. Note that the operation of the image capture apparatus 101 is similar to that of a typical camera and is, therefore, not described here.

In S301, the image obtainment unit 202 obtains a first image obtained by image capture based on a light beam passing through the first optical system 102 of the image capture apparatus 101.

Figure 4A:
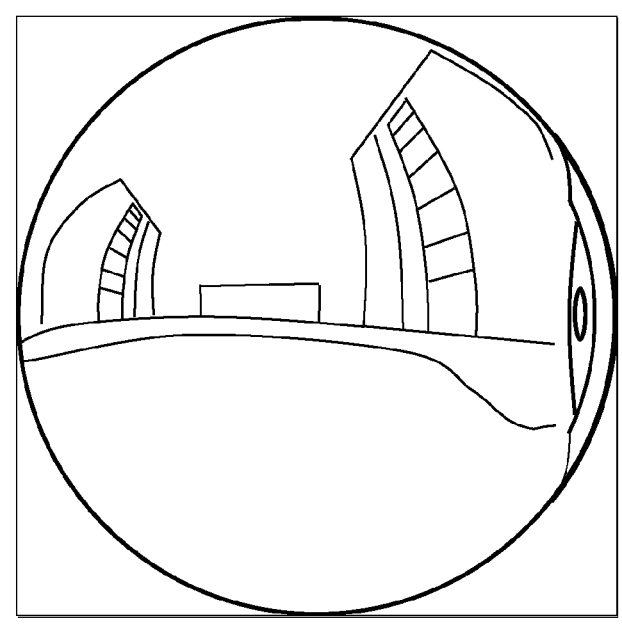
FIGS. 4A and 4B are diagrams each showing an example of a first image obtained by image capture by the image capture apparatus.
Figure 4B:
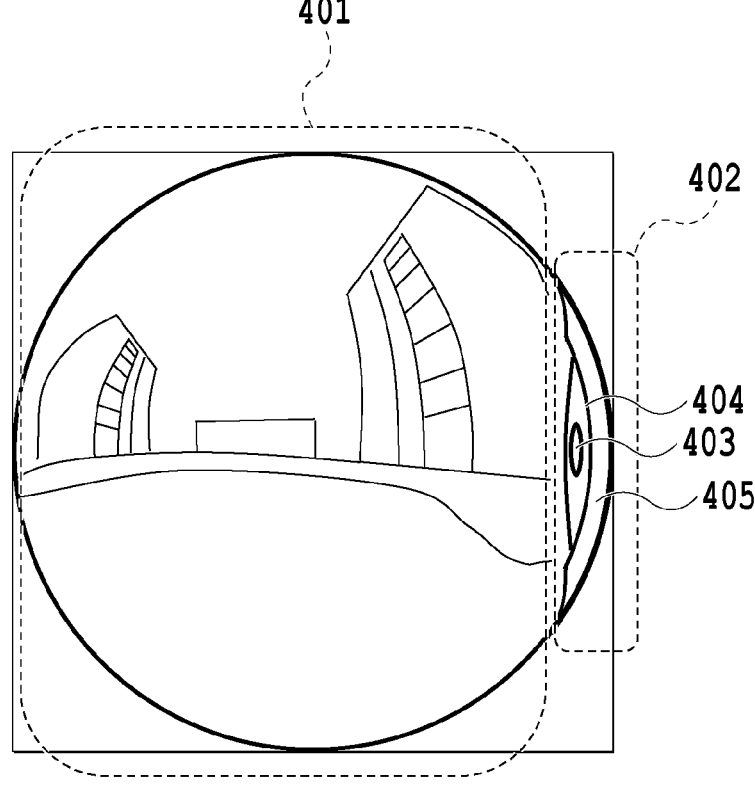

FIGS. 4A and 4B are diagrams showing an example of a first image. FIGS. 4A and 4B are diagrams showing a first image needing no calibration because the first optical system 102 or the first image capture sensor unit 104 is situated at its designed value (reference value). A scenery 401 is a main object selected by a user and includes a building and a road. An image 402 is an image of at least part of the second optical system 103.

As described earlier, in the image capture apparatus 101 of the present embodiment, the first optical system 102 and the second optical system 103 are situated to capture an image of part of the other optical system. For this reason, the first image includes an image of part of the second optical system 103. As shown in FIG. 4B, the image of the second optical system 103 includes not only a lens surface 403, but also part of a lens rim 404 and a casing 405.

FIGS. 5A to 5D are diagrams showing an example of a first image needing calibration using first calibration parameters because the first optical system 102 or the first image capture sensor unit 104 is deviated from its designed position.

Figure 5A:
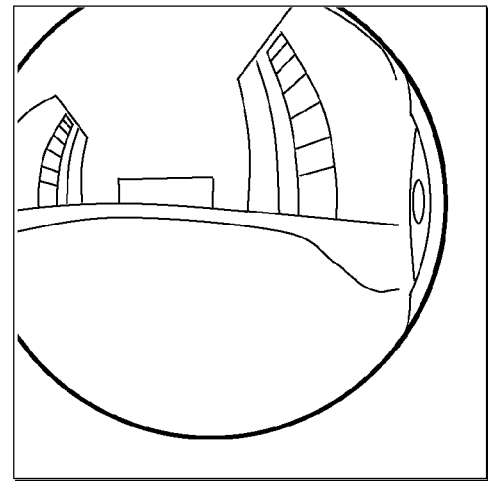
FIGS. 5A to 5D are diagrams showing examples of a first image obtained by image capture by the image capture apparatus.
Figure 5B:
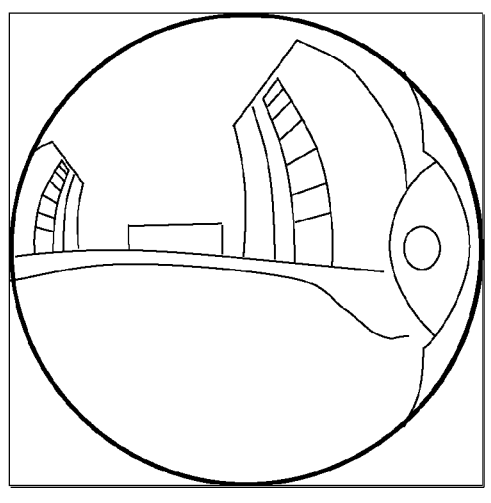
Figure 5C:
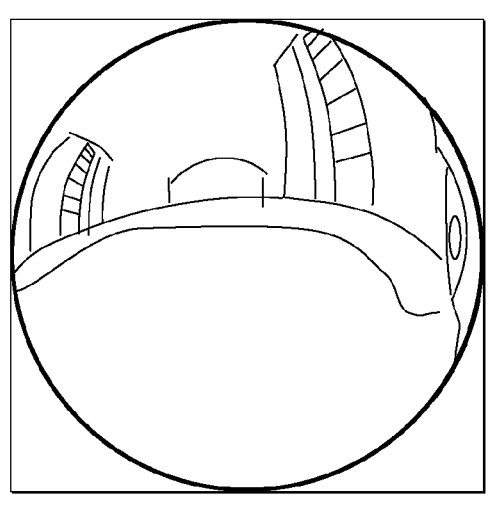
Figure 5D:
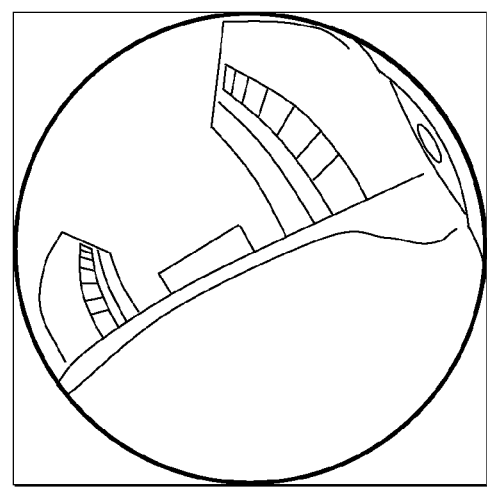

FIG. 5A is a diagram of a first image in which the optical axis has offset-moved to the upper left overall, with an image of the second optical system 103 also having offset-moved to the upper left together. FIG. 5B is a diagram of a first image of a case where the first optical system 102 has rightward pan rotation from the designed position, with a larger part of an image of the second optical system 103 being included in the first image. FIG. 5C is a diagram of a first image of a case when the first optical system 102 has a downward tilt rotation from the designed position, with part of the building as an object being out of the frame. FIG. 5D is a diagram of a first image of a case when the first image capture sensor unit 104 has a roll rotation from the designed position, with the scenery and an image of the second optical system 103 having a roll rotation. FIGS. 5A to 5D are each a diagram showing an example of a first image of a case when only one parameter is deviated, but, typically, a plurality of parameters are deviated at the same time. In that case, a first image obtained has more complicated changes.

In S302, processing is performed to determine first calibration parameters based on an image of the second optical system 103 in the first image. S302 determines the first calibration parameters by searching for proper parameters using template matching or feature matching. The first calibration parameters may also be searched for using learning. Details will be described about the processing of this step of determining the first calibration parameters using template matching.

In S303, the parameter output unit 204 outputs the first calibration parameters determined in S302.

[First Calibration Parameter Determination Processing Using Template Matching]

Figure 6:
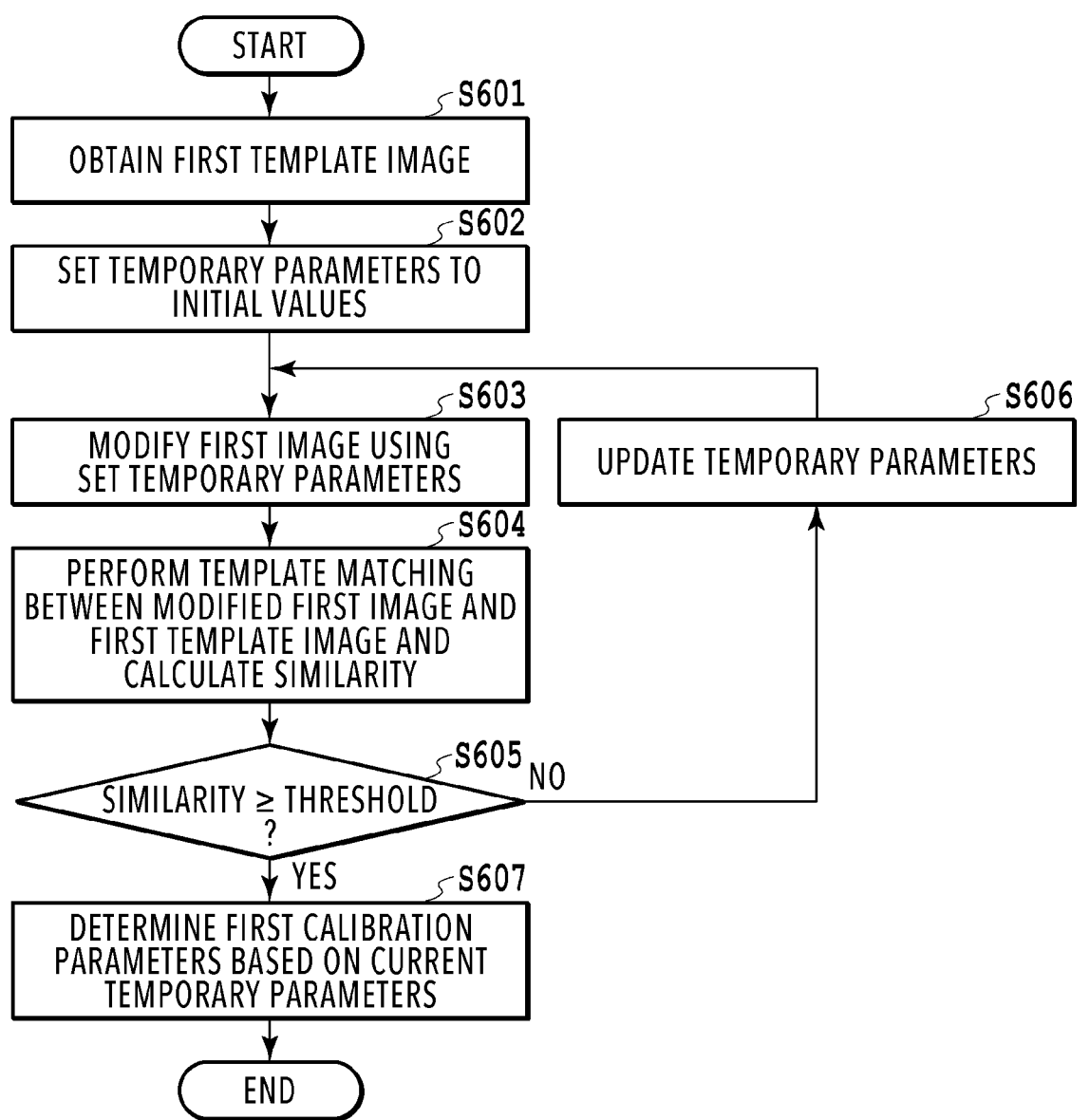
FIG. 6 is a flowchart showing first calibration parameter determination processing.

FIG. 6 is a flowchart illustrating details of the first calibration parameter determination processing in S302. FIG. 6 is used to describe a method for determining the first calibration parameters by doing a search using template matching.

In S601, the determination unit 203 obtains a first template image.

Figure 7:
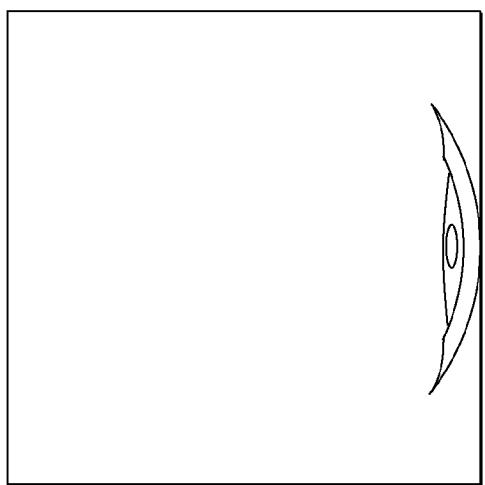
FIG. 7 is a diagram showing an example of a first template image.

FIG. 7 is a diagram showing an example of the first template image. The first template image is an image showing only an image of the second optical system 103 in a first image and is obtained in advance through calibration using a method seen in, for example, Japanese Patent Laid-Open No. 2003-244521, referenced above. In other words, the first template image is an image showing only an image of the second optical system 103 in a first image captured with the first optical system 102 and the first image capture sensor unit 104 being at positions and in shapes according to their designed values.

Note that because the first template image only has to have the part of an image of the second optical system 103, the first image may be cropped to remove a part other than the image of the second optical system 103 and held as the first template image. Such cropping can save storage space.

In S602, the determination unit 203 sets temporary parameters to initial values. Although using designed values or the most frequent or average values obtained by measurement, as the initial values, allows faster determination of the first calibration parameters, the initial values may be zero.

S603 to S606 are looped processes. In the present embodiment, an operation of modifying the first image according to the temporary parameters and comparing the modified first image with the first template image is repeated while updating the temporary parameters. Then, the first calibration parameters are determined based on the temporary parameter with which an image of the second optical system 103 in the modified first image is similar to the first template image.

In S603, the determination unit 203 modifies the first image obtained in S601 according to the currently-set temporary parameters. A temporary parameter is, for example, a value indicating a deviation from a reference value, such as, for example, the offset movement amount of the optical axis or the angle of a pan, tilt, or roll rotation. The reference value is, for example, a designed value. In this case, the determination unit 203 modifies the image so as to cancel the deviation. For example, the first image having an offset movement of the optical axis or having a pan, tilt, or roll rotation as shown in FIGS. 5A to 5D is expected to be modified so as to have the position and the shape according to the designed values as shown in FIG. 4A.

In S604, the determination unit 203 performs template matching between the first image modified in S603 and the first template image shown in FIG. 7, and calculates a similarity between the modified first image and the first template image. The similarity is calculated using a method such as SAD or SSD.

In a case when the set temporary parameters are correct, as a result of the modification in S603, the image of the second optical system 103 in FIGS. 5A to 5D has the position and the shape according to the design values as shown in FIG. 4A. In that case, a high similarity is obtained in S604. In a case when the set temporary parameters are wrong, a low similarity is obtained in S604. Thus, a deviation from a designed value (a reference value) related to the first optical system 102 or the first image capture sensor unit 104 can be detected based on the temporary parameters with which the similarity is higher than a threshold.

Note that, since the pan rotation and the tilt rotation are three-dimensional rotation, the modification of the first image in S603 to cancel the offset movement of the optical axis and the rotation may be performed along with distortion correction. Distortion correction involving an optical axis offset (an intrinsic parameter) and a rotation (an extrinsic parameter) is a common method and is, therefore, not described here.

Figure 8A:
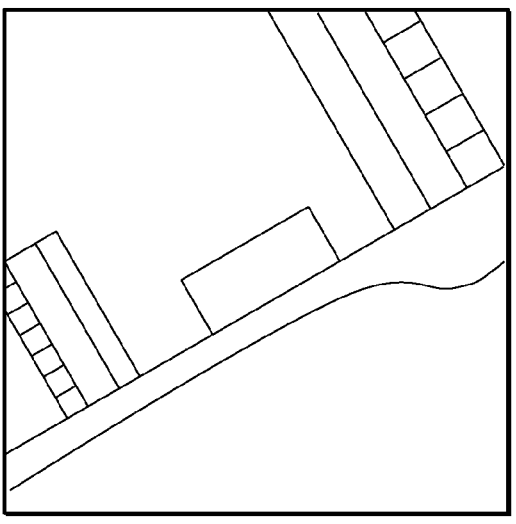
FIGS. 8A and 8B are diagrams illustrating modification of an image using calibration parameters.
Figure 8B:
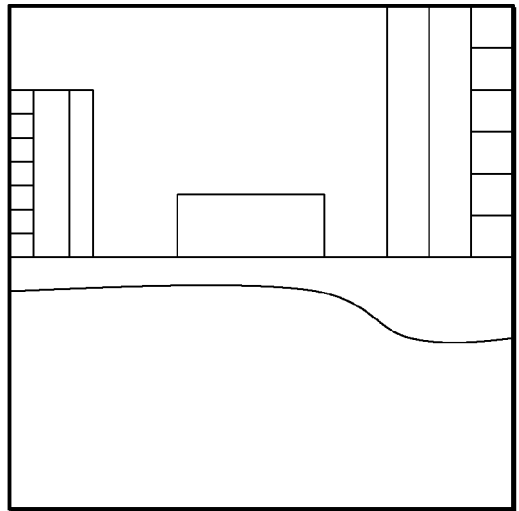

FIGS. 8A and 8B are diagrams illustrating first image modification processing. FIGS. 8A and 8B omit the image of the second optical system. FIG. 8A is an image obtained by perspective projection conversion on the first image in FIG. 5D with only distortion correction being performed and without including the modification processing to cancel offset movement of the optical axis and rotation. Meanwhile, FIG. 8B is an image obtained by perspective projection conversion on the first image in FIG. 5D with the parameter for a roll rotation of the first optical system 102 from the designed position taken into consideration as well. In a case when the temporary parameters thus set are correct, modifying the first image to cancel a deviation according to the temporary parameters produces a first image similar to one that is captured with the first image capture sensor unit 104 being placed horizontally.

In a case when the first image is subjected to distortion correction, as well, in S603, distortion may be added again to the first image as shown in FIG. 8B, which has been modified according to the temporary parameters to cancel the offset movement of the optical axis and rotation and which has been corrected in distortion. Even in a case when distortion correction is thus performed at the same time in S603, adding distortion to the first image allows proper matching between the first image and the first template image in S604.

Alternatively, in a case when the first image is corrected in distortion at the same time in S603, distortion correction may be performed similarly on the first template image in FIG. 7 as well. Then, template matching may be performed between the first image that has been modified to cancel the offset movement of the optical axis or rotation and corrected in distortion and the first template image corrected in distortion, so that the images that have been corrected in distortion can be matched with each other. In that case, an alternative configuration may be employed in which a first template image corrected in distortion is stored in advance, so that the first template image corrected in distortion is obtained in S601.

In S605, the determination unit 203 determines whether the calculated similarity is equal to or above a threshold. If the similarity is equal to or above the threshold, the currently-set temporary parameters are determined as being a value appropriate to represent a deviation from the reference value. The threshold is different depending on how the similarity is calculated and on the properties of the image capture apparatus, and, therefore, may be empirically defined through trials.

If the similarity is below the threshold (No in S605), it is considered that the currently-set temporary parameters are not proper values. Thus, the processing proceeds to S606 for a retry.

In S606, the determination unit 203 sets different values as the temporary parameters. The value to set may be defined using optimization based on the tendency of the similarity or may be defined using grid search, or the like.

In a case when the similarity is equal to or above the threshold (YES in S605), the determination unit 203 proceeds to S607 and determines first calibration parameters according to the currently-set temporary parameters. The currently-set temporary parameters may be determined as the first calibration parameters as they are. The determined first calibration parameters are outputted in S303.

In S303, the first calibration parameters are outputted to, for example, a user. For example, the user can obtain an image calibrated in rotation, such as a tilt, by inputting the first calibration parameters determined by the image calibration apparatus 201 into an image processing apparatus that performs distortion correction, and the like. An image calibrated in rotation such as a tilt is used for, for example, generation of a VR image. Alternatively, the user can perform more accurate distance measurement by inputting the first calibration parameters determined by the image calibration apparatus 201 into a distance measurement apparatus.

In this way, the present embodiment can determine first calibration parameters by searching for parameters until parameters with which the similarity is equal to or above the threshold are found.

Note that, in the determination in S605, even in a case when the similarity is below the threshold, the search may be stopped after completion of a certain number of times of the looped processing from S603 to S606. In that case, the determination unit 203 determines the first calibration parameters based on the temporary parameters set for the highest similarity, and those values may be outputted in S303.

Note that a similar method may be used to determine other parameters unmentioned above, such as magnification and distortion.

[Method for Determining Second Calibration Parameters]

The image obtainment unit 202 may obtain a second image, which is a captured image based on a light beam passing through the second optical system 103. The second image includes an image of part of the first optical system 102. Thus, the determination unit 203 may determine second calibration parameters using a method similar to that used to determine the first calibration parameters.

In that case, a second template image to be compared with a second image modified according to set temporary parameters may be generated based on the first template image. For example, in a case when the image of the first optical system 102 seen from the second optical system 103 is the same as a horizontal flip of the image of the second optical system 103 seen from the first optical system 102, the first template image in FIG. 7 may be flipped horizontally to generate the second template image.

[Image Capturing Apparatus]

Figure 9A:
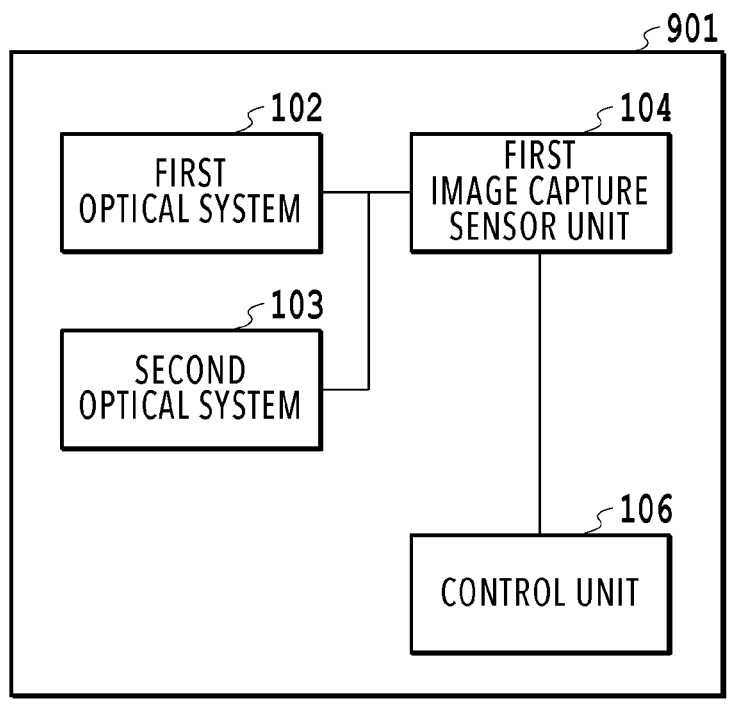
FIGS. 9A and 9B are diagrams showing the configuration of an image capture apparatus.
Figure 9B:
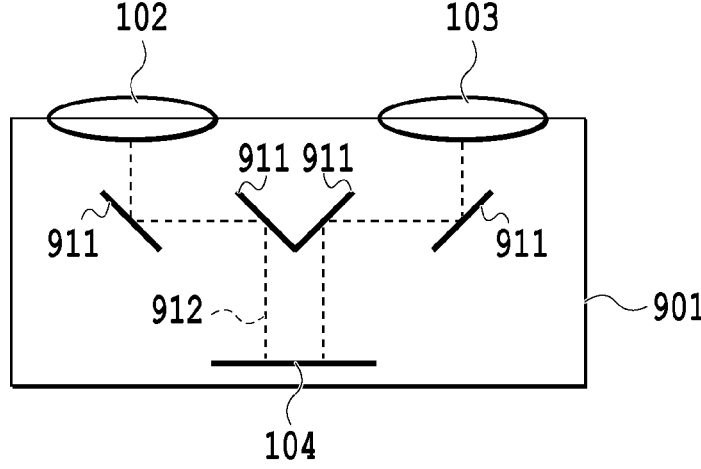

FIGS. 9A and 9B are diagrams showing an image capture apparatus. The present embodiment can also be applied to a case of determining first or second calibration parameters from an image obtained by image capture by an image capture apparatus 901 shown in FIGS. 9A and 9B. The same configurations as those in the image capture apparatus 101 in FIG. 1 are denoted by the same reference numerals as those used in FIG. 1. Differences from the image capture apparatus 101 in FIG. 1 are described.

Paths 912 indicated by dotted lines are paths of light beams. The image capture apparatus 901 is configured such that the first image capture sensor unit 104 receives not only a light beam through the first optical system 102, but also, a light beam through the second optical system 103 via prisms 911, and is different from the image capture apparatus 101 in FIG. 1 in this point. The image capture apparatus 901 in FIGS. 9A and 9B has no second image capture sensor unit 105. The prisms 911 may be mirror-like objects or may be formed only by lenses if possible. The image obtainment unit 202 can obtain a first image and a second image at the same time from the first image capture sensor unit 104. The calibration parameter determination processing is performed using the same method described above.

In addition, also in a case of an image capture apparatus having more than two optical systems, the calibration parameters can be determined using an image of any of the other optical systems included in a captured image obtained via a certain optical system.

According to the present embodiment described above, calibration parameters for the image capture apparatus having a plurality of optical systems can be determined without having to place a calibration pattern additionally. The unnecessity of an additional calibration pattern allows determination of calibration parameters for even an unfixable image capture apparatus, causing less work on the part of the user.

For example, in a case when the offset positions of the lenses and the image capture apparatus change due to thermal expansion, or the like, calibration is needed for every image capture. In this case, a calibration method involving additional placement of a calibration pattern requires placement of the calibration pattern every time, requiring work on the part of a user. By contrast, according to the present embodiment, even in a case of determining calibration parameters for every image capture, the calibration parameters can be determined with less work on the part of the user. For this reason, the present embodiment allows VR image creation and distance measurement to be performed with less work on the part of a user.

[Template Image]

Note that, in the description given above, template matching is performed on an image of part of the second optical system 103, assuming that the first template image in FIG. 7 is an image of part of the second optical system 103. However, due to reflection of a scenery on the lens surface 403 of the second optical system 103, the image may not always be the same. For this reason, the lens surface may be excluded from the first template image or the second template image. For example, in the image 402 of the second optical system 103, only the images of the lens rim 404 and the casing 405 may be used for the template matching as the first template image.

Embodiment 2

In some image capture apparatuses having a plurality of optical systems, the distance between the first optical system 102 and the second optical system 103 is very close to each other. For this reason, in a case when an image is captured with a focus on the scenery in image capture through the first optical system 102, the image of the second optical system 103 may be out of focus. In this case, the image of the second optical system 103 in the first image may be blurry. In this way, a change in an image capture parameter such as a focal length causes a change in the image of the second optical system 103 in the first image. Thus, template matching using one template image as in Embodiment 1 may offer low robustness.

Thus, described in the present embodiment is a method for dealing with a change in the image of the second optical system 103 in the first image due to an image capture parameter. Differences from Embodiment 1 are mainly described in the present embodiment. Portions that are not set forth below are the same configurations and processes as those in Embodiment 1.

Figure 10:
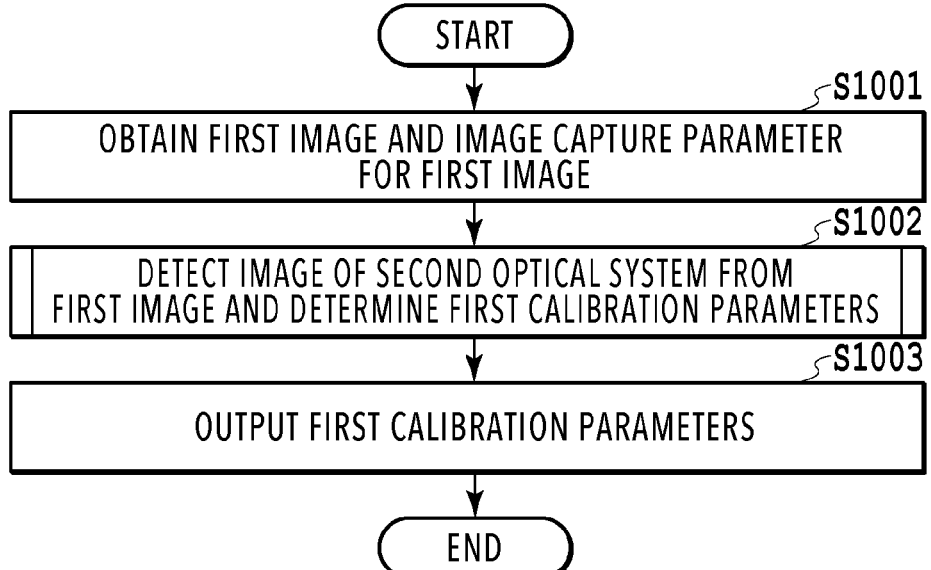
FIG. 10 is a flowchart showing processing performed by the image calibration apparatus.

FIG. 10 is a flowchart for illustrating an example of processing performed by an image calibration apparatus of the present embodiment.

In S1001, the image obtainment unit 202 obtains a first image as in S301 in Embodiment 1. In the present embodiment, the image obtainment unit 202 also obtains an image capture parameter used by the image capture apparatus 101 in performing image capture to obtain the first image. For example, the image capture parameter is included in the header of data on the first image. In that case, the image obtainment unit 202 obtains the image capture parameter from the header of the first image.

Figure 11:
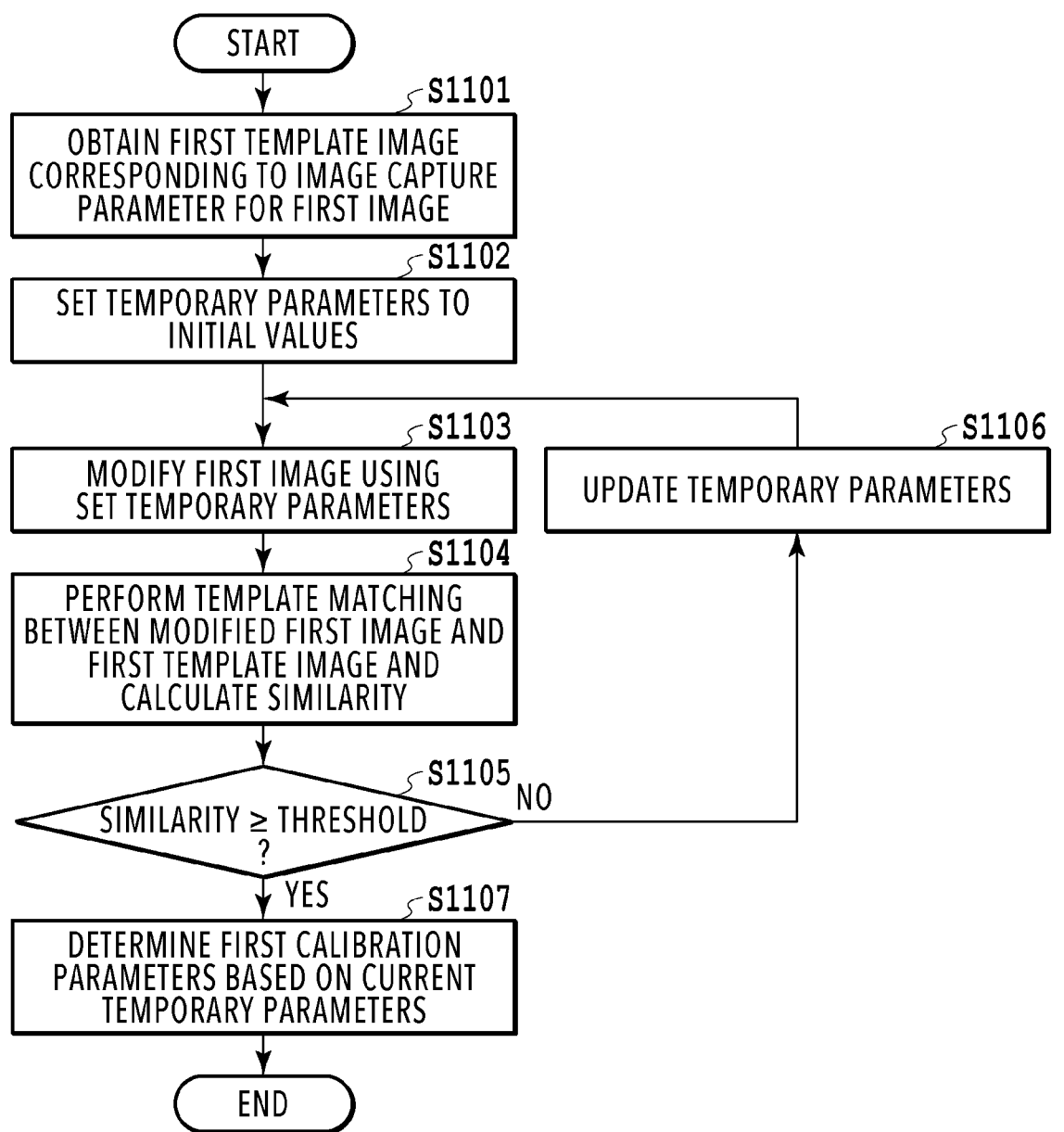
FIG. 11 is a flowchart showing first calibration parameter determination processing.

FIG. 11 is a flowchart illustrating details of the first calibration parameter determination processing of the present embodiment in S1002.

In the present embodiment, the image calibration apparatus 201 holds first template images corresponding to conceivable image capture parameters in advance. A first template image corresponding to an image capture parameter is a template image generated from an image obtained by image capture using the image capture parameter.

Then, in S1101, the determination unit 203 obtains a first template image generated from an image obtained by image capture using the same image capture parameter as the image capture parameter obtained in S1001. Steps S1102 to S1107 are the same as S602 to S607 and are, therefore, not described here. Also, S1003 in FIG. 10 is the same step as S303 and is, therefore, not described here.

The image capture parameter is, for example, a focal length. The first template image thus generated from an image obtained by image capture using the same focal length as the first image has a degree of blurriness similar to that of the first image. Thus, even in a case when the image of the second optical system 103 in the first image is blurry, a first calibration parameter can be determined properly using template matching. Alternatively, the image capture parameter may be an f-number (an aperture value). The focal length also changes according to an f-number, consequently changing a degree of blurriness. Thus, by preparation of first template images corresponding to f-numbers, a first template image with a degree of blurriness similar to that of the first image can be selected.

The image capture parameter may be a plurality of parameters. For example, a mode may be employed in which first template images corresponding to both of focal lengths and f-numbers are prepared.

Alternatively, the image capture parameter used in the present embodiment is not limited to a focal length and an f-number, as long as an image capture parameter can be a factor for changing the image of the second optical system 103. The image capture parameter may be a parameter such as, for example, an exposure time, an ISO speed, or a gain. However, there is no need to accommodate exposure as long as a method that is robust in terms of brightness is used for the matching method.

[Method for Generating a Template Image]

Trying to prepare first template images corresponding to a large number of image capture parameters in advance increases the number of first template images exponentially, thus requiring a massive amount of memory to store the first template images.

Thus, for example, in a case of generating first template images corresponding to f-numbers, a first template image corresponding to f/2.8 and a first template image corresponding to f/5.6 are prepared and stored in advance. Meanwhile, a first template image corresponding to f/4.0 may be not prepared. In a case when the need of the first template image corresponding to f/4.0 arises, a third template image may be generated as the first template image corresponding to f/4.0 by interpolation using the first template image corresponding to f/2.8 and the first template image corresponding to f/5.6. Then, the template matching may be performed using the third template image. The third template image may be generated by, for example, averaging of the first template image corresponding to f/2.8 and the first template image corresponding to f/5.6.

As thus described, according to the present embodiment, the first calibration parameter can be appropriately determined even in a case when the image of the second optical system 103 in the first image has a change due to blurriness.

Embodiment 3

In the method described in Embodiment 2, the template matching is performed using a first template image corresponding to an image capture parameter. However, depending on an image capture parameter, the first template image may have an indistinct feature.

For example, in a case of a small f-number and a rather long focal length, the image of the second optical system 103 may be blurry greatly. In that case, due to an indistinct feature, there may be a match with a region other than the second optical system, leading to erroneous determination of first calibration parameters. In a case when the image of the second optical system 103 is blurry, not only in template matching, but also in feature matching or matching by learning, the first calibration parameters may be similarly determined erroneously.

Thus, the present embodiment describes a method in which an image capture apparatus performs image capture to obtain a first image suitable for determining first calibration parameters (called a first image for calibration), and the first calibration parameter are determined using the first image for calibration. Differences from Embodiment 1 are mainly described in the present embodiment. Portions that are not set forth below are the same configurations and processes as those in Embodiment 1.

[Operation Flow of the Image Capture Apparatus and the Image Calibration Apparatus]

FIG. 12 is a diagram illustrating an operation flow performed after a user presses an image capture button on the image capture apparatus. FIG. 12 includes not only the flow of the calibration parameter determination processing like the one in FIG. 3, but also the flow of image capture by the image capture apparatus.

In S1201, the control unit 106 executes image capture based on a light beam passing through the first optical system 102. A first image obtained in this step is stored in, e.g., a RAM or a nonvolatile memory (neither is shown) in the image capture apparatus 101. For example, in response to a user pressing an image capture button, the control unit 106 causes the first image capture sensor unit 104 to start image capture. In this step, an image capture parameter is a value desired by the user, and in many cases, a focus is on the scenery 401 in FIG. 4, not on the image 402 of the second optical system 103.

In S1202, the control unit 106 stores the image capture parameter used in the image capture in S1201.

In S1203, the control unit 106 adjusts and changes the image capture parameter so that the image capture parameter may be suitable for the second optical system 103 and may make the image of the second optical system 103 unblurry. For example, the focus is adjusted to be on the part of the image of the second optical system 103. Also, an f-number may be increased and adjusted so that the focus may be on the image of the second optical system 103. Also, the control unit 106 may not only adjust the blurriness, but also adjust an image capture parameter, such as an exposure time or an ISO speed by placing an auto-exposure (AE) photometric area on the part of the image of the second optical system 103 to make the image of the second optical system 103 properly bright. Also, the control unit 106 may adjust a parameter that affects image quality, such as outline emphasis, noise removal, or JPEG compression ratio.

In S1204, using the image capture parameter adjusted and changed in S1203, the control unit 106 executes image capture based on a light beam passing through the first optical system 102. An image obtained in this step is called a first image for calibration. The first image for calibration is saved in, e.g., the RAM or the nonvolatile memory. The image capture for obtaining the first image for calibration is performed automatically after the image capture in S1201 for obtaining the first image, without the user operating the image capture button.

To be prepared for the next time a user performs image capture, in S1205, the control unit 106 restores the original setting of the image parameter based on the value of the image capture parameter stored in S1202. By such processing, every time a user performs image capture of a single image, an image suitable for calibration parameter determination processing can be obtained at the same time.

In S1206, the control unit 106 outputs the first image for calibration to the image calibration apparatus 201.

The processing from S1207 to S1209 is processing performed by the image calibration apparatus 201 and is basically the same as the processing from S301 to S303. However, S1207 is different from S301 in that the image obtained in S1207 is the first image for calibration. Note that the first image for calibration may be cropped to leave only an area that may include the image of the second optical system 103 because a part other than the image of the second optical system 103 is unnecessary. The cropping of the first image for calibration can save image storage space and transfer size. The area that may have the image of the second optical system 103 may be determined based on designed values or measurement. In S1208, the image modification in S603 and the matching in S604 are performed, taking the cropped amount into consideration.

Also, S1208 is different from S302 in that the image modified using a temporary parameter and compared with a first template image is the first image for calibration. Because the first image for calibration in the present embodiment has a more vivid image of the second optical system 103 than the first image obtained in S1201, matching accuracy can be improved.

Note that, in a case when a first image for calibration having a vivid image of the second optical system 103 cannot be obtained due to a poor image capture environment, many attempts may be made to obtain the first image for calibration. For example, S1203 to S1204 may be repeated until a first image for calibration having a vivid image of the second optical system 103 is obtained.

Also, S1202 to S1206 do not have to be performed immediately after the image capture in S1201 for obtaining the first image. For example, in a case when it can be determined that there has been no change in the placement conditions of the optical system or the image capture sensor, S1202 to S1206 may be performed once the image capture environment becomes better. For example, S1202 to S1206 may be performed after, for example, an acceleration sensor or a gyroscope sensor detects that the vibration of the image capture apparatus 101 has fallen to or below a certain value. Also, in a case when an adequate S/N ratio cannot be secured because of a dark image, an image improved in S/N ratio may be obtained as a first image for calibration by averaging of a plurality of images obtained as a result of repeating S1204 to perform image capture a plurality times.

Although the operation in and after S1209 is not specifically shown in the present embodiment because the present embodiment focuses on the operation up to the calibration parameter determination processing, the first calibration parameter outputted in S1209 is not applied to the first image for calibration. The first calibration parameter is meant to be applied to the first image that has been obtained in S1201 and, in which the scenery is the main object, for the purpose of performing, e.g., distortion correction for generating a VR image, or the like, or distance measurement processing.

[Example of Operation for Videos]

In image capture of a still image, the first image and the first image for calibration have a one-to-one correspondence, but, in image capture of a video, it may be difficult to obtain a first image for calibration corresponding to a frame for each frame. In this case, a first image for calibration may be obtained before the image capture of a video is started or after the image capture of a video is ended, and be associated with all the frames of the video.

According to the present embodiment described above, even in a case when the image of the second optical system included in the first image is not vivid due to an image capture parameter, a calibration parameter can be determined without lowering accuracy.

Embodiment 4

Embodiment 1 also describes a method for determining the second calibration parameters for the second optical system when the first calibration parameters for the first optical system is determined. However, determining two sets of calibration parameters can be time-consuming.

Thus, the present embodiment describes a method for reducing the processing load for determining two sets of calibration parameters in a case of determining second calibration parameters in addition to first calibration parameters. Differences from Embodiment 1 are mainly described in the present embodiment. Portions that are not set forth below are the same configurations and processes as those in Embodiment 1.

[Calculation of First and Second Calibration Parameters]

Figure 13:
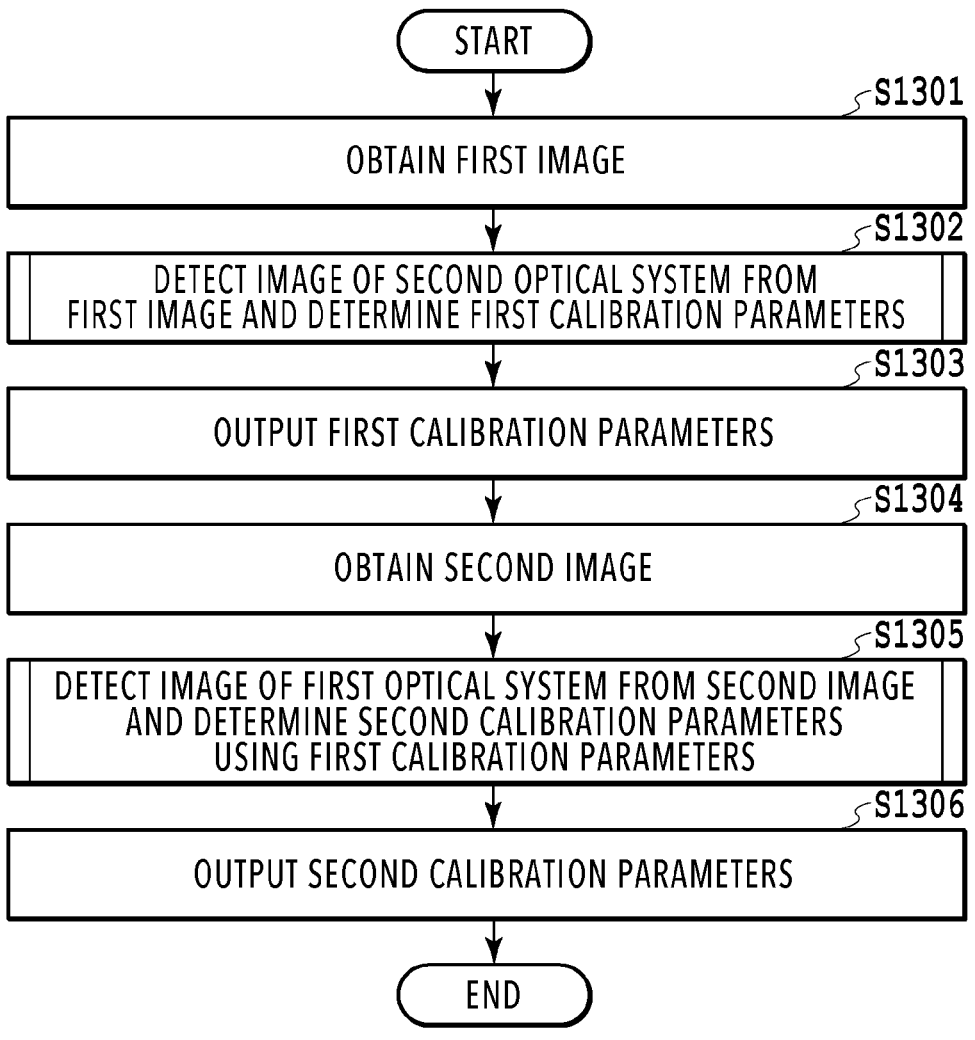
FIG. 13 is a flowchart showing processing performed by the image calibration apparatus.

FIG. 13 is a flowchart illustrating an example of calibration parameter determination processing in the present embodiment.

S1301 to S1303 are processing similar to S301 to S303, and steps for determining and outputting first calibration parameters. Note that the first calibration parameters outputted from the parameter output unit 204 are inputted to the determination unit 203 as well.

In S1304, the image obtainment unit 202 obtains a second image obtained by image capture based on a light beam passing through the second optical system 103.

In S1305, as in S1302, the determination unit 203 performs the processing of the flowchart in FIG. 6 to determine second calibration parameters by searching for temporary parameters with which the image of the first optical system 102 in the second image is similar to the second template image. However, unlike in S1302, the first calibration parameters already determined by the determination unit 203 are utilized to limit the ranges of values to be set as the temporary parameters. A method for determining second calibration parameters utilizing first calibration parameters will be described later.

In S1306, the parameter output unit 204 outputs the second calibration parameters determined in S1305.

In a case when two optical systems are in a single casing similar to the image capture apparatus in FIG. 1 or 9, the first calibration parameters and the second calibration parameters may have some related parameters. An example of such a relation is such that, in a case when one of the optical systems is oriented in a certain direction, the other one of the optical systems is also oriented roughly in the same direction. Thus, a first calibration parameter and a second calibration parameter about orientation may be related to each other. In this case, the first calibration parameter and the second calibration parameter are values close to each other.

For example, a first calibration parameter and a second calibration parameter have the relation as expressed by Formula 1:

$$P_1 - \alpha \leq P_2 \leq P_1 + \alpha \qquad \text{Formula 1}$$

where $P_1$ is the first calibration parameter and $P_2$ is the second calibration parameter.

Thus, the determination unit 203 can determine the second calibration parameter by focusing on the possible range of $P_2$ in Formula 1. As an example, it is assumed here that $P_1$ is a parameter indicative of a rotation of the first optical system 102, and $P_2$ is a parameter indicative of a rotation of the second optical system 103. In this case, because the parameter $P_1$ indicative of a rotation of the first optical system 102 has been determined in S1302, a temporary parameter can be set focusing on the possible range of $P_2$ in Formula 1 at S602 or S606 in S1305. In Formula 1, a is a variance and is defined based on measurement or design value.

[Processing for Determining the First and Second Calibration Parameters Concurrently]

In the flowchart in FIG. 13 described above, the second calibration parameters are determined after the first calibration parameters are determined. Alternatively, the first calibration parameter determination processing (S1302) and the second calibration parameter determination processing (S1305) may be performed in parallel. In this case, each temporary parameter may be set so that the difference between a temporary parameter set to determine a first calibration parameter and a temporary parameter set to determine a second calibration parameter may not exceed a prescribed range.

For example, in a case when $$|P_2 - P_1| \leq \alpha \qquad \text{Formula 2}$$

where $P_1$ is a temporary parameter set in S1302, and $P_2$ is a temporary parameter set in S1305, the determination unit 203 performs S603 to S605 to perform processing (search) to determine whether the temporary parameter is proper.

Meanwhile, the determination unit 203 does not perform S603 to S605 not to perform the parameter search in a case when $$|P_2 - P_1| > \alpha. \qquad \text{Formula 3}$$

By performing such processing, in a case when the combination of temporary parameters is regarded as an impossible combination based on the relativeness between a first calibration parameter and a second calibration parameter, the determination unit 203 does not modify the image and can set a different temporary parameter. This method allows unnecessary template matching not to be executed and can, therefore, speed up the first and second calibration parameter determination processing.

[Processing to Determine Second Calibration Parameters for the Image Capture Apparatus 901]

Also, in a case when the image capture apparatus is structured like the image capture apparatus 901 in FIG. 9, the relativeness between first calibration parameters and second calibration parameters may be established by their respective plurality of parameters. Such a case is, for example, a case when the first image capture sensor unit 104 in FIG. 9 has a roll rotation from its designed value or a case when the entire lens unit including the first optical system 102, the second optical system 103, and the prisms 911 has a roll rotation from its design value.

Figure 14A:
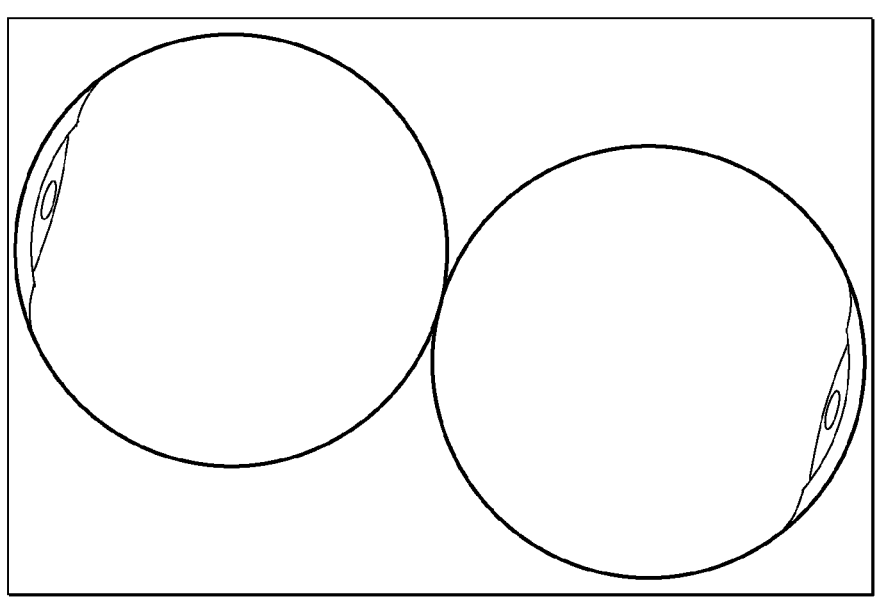
FIGS. 14A to 14C are diagrams showing an example of an image obtained by image capture by the image capture apparatus.
Figure 14B:
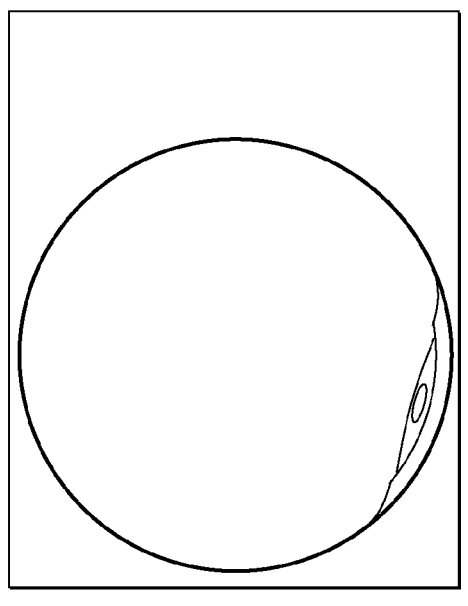
Figure 14C:
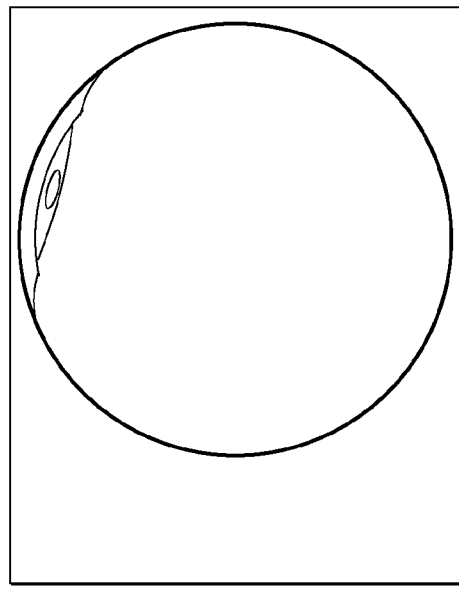

FIG. 14A is a diagram showing an example of a captured image obtained in a case when, in the image capture apparatus 901 in FIG. 9, the first image capture sensor unit 104 has a roll rotation or in a case when the entire lens unit has a roll rotation. FIGS. 14A to 14C show only an image circle representing how it looks from a certain optical system and an image of the other optical system in the image circle, and do not show the scenery.

FIG. 14B is a first image obtained by separating the part of the right image circle in FIG. 14A, and FIG. 14C is a diagram of a second image obtained by separating the part of the left image circle in FIG. 14A. With the structure of the image capture apparatus 901 as shown in FIG. 9, the image circles representing how it looks from the respective optical systems are positioned as reversed horizontally as shown in FIG. 14A.

Figure 15:
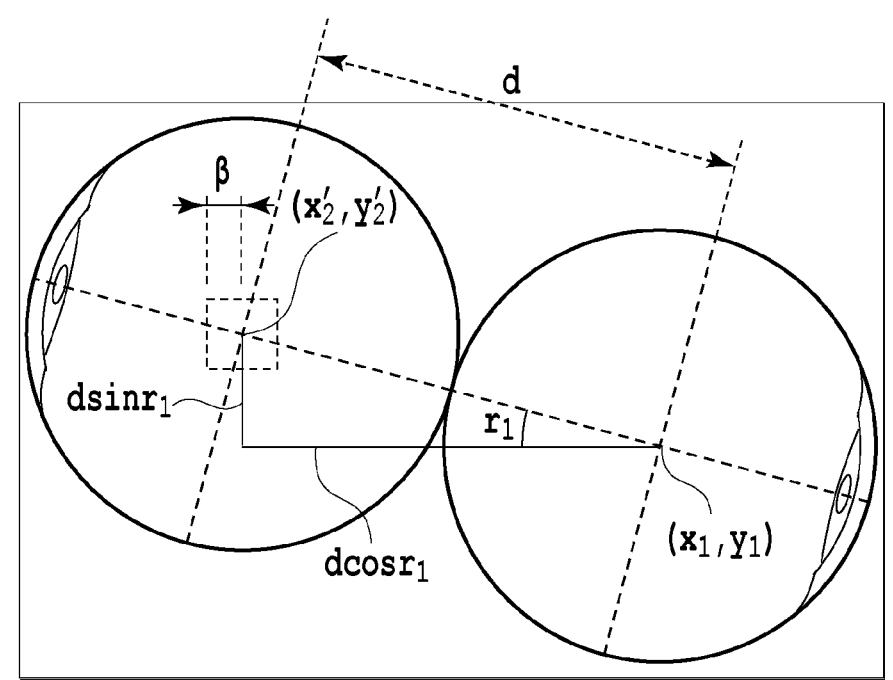
FIG. 15 is a diagram showing positional relations in an image obtained by image capture by the image capture apparatus.

FIG. 15 is a diagram showing the same captured image as the one in FIG. 14A and illustrating a method for determining a second calibration parameter using a first calibration parameter. Using FIG. 15, a description is given of a method for determining a second calibration parameter in a case where in the image capture apparatus 901 in FIG. 9, the first image capture sensor unit 104 has a roll rotation or the entire lens unit has a roll rotation.

First, using the first image in FIG. 14B, the determination unit 203 determines at least the coordinates $(x_1, y_1)$ of the center of the optical axis and an angle $r_1$ of the roll rotation, as the first calibration parameters. Next, the determination unit 203 determines at least the coordinates $(x_2, y_2)$ of the center of the optical axis as the second calibration parameters.

In FIG. 15, the coordinates $(x_1, y_1)$ of the center of the optical axis of the first optical system 102 and the angle $r_1$ of the roll rotation are parameters already determined. A distance d is the distance between the centers of the two image circles. The distance d is obtained based on a designed value or measurement.

Coordinates $(x'_2, y'_2)$ are the expected coordinates of the optical axis of the second optical system 103. The value of $x'_2$ and the value of $y'_2$ hold the relations in Formulae 4 and 5, respectively:

$$x'_2 = x_1 - d \cos r_1, \text{ and} \qquad \text{Formula 4}$$

$$y'_2 = y_1 - d \sin r_1. \qquad \text{Formula 5}$$

Because other factors such as thermal expansion also have influence in reality, the relation between the coordinates $(x'_2, y'_2)$ and the coordinates $(x_2, y_2)$ of the center of the optical axis of the second optical system 103 holds the relations in Formulae 6 and 7. In Formulae 6 and 7, $\beta$ is variance due to other components and is obtained based on a designed value or measurement.

$$x'_2 - \beta \leq x_2 \leq x'_2 + \beta \qquad \text{Formula 6}$$

$$y'_2 - \beta \leq y_2 \leq y'_2 + \beta \qquad \text{Formula 7}$$

In a case of determining the center of the optical axis of the second optical system 103, a search may be made by setting a temporary parameter that is a candidate in the range of $x_2$ in Formula 6 and the range of $y_2$ in Formula 7 (in the dot-lined rectangular in FIG. 15).

The relation between the center $(x_1, y_1)$ of the optical axis of the first optical system 102 and the center $(x_2, y_2)$ of the optical axis of the second optical system 103 can be directly applied to the relation between an offset of the optical axis of the first optical system and an offset of the optical axis of the second optical system. Thus, in a case of determining an offset of the optical axis as a second calibration parameter, a search may be done by using $(x_1, y_1)$ and $(x_2, y_2)$ in the above formulae as offsets of the optical axes and setting a temporary parameter in the range in Formulae 6 and 7. It goes without saying that the order of determining the first calibration parameter and the second calibration parameter may be reversed.

As thus described, according to the present embodiment, faster processing can be achieved in determining the second calibration parameters for the second optical system 103 and the first calibration parameters for the first optical system 102.

Note that, in a case when no proper parameter is found in determination of the second calibration parameter even after limiting the search range as described above, the limit of the search range may be canceled to do a search again. In that case, in a case when a proper calibration parameter determined is out of the search range, there is also a possibility that the image capture apparatus is experiencing excessive deformation beyond expectation. Thus, the image calibration apparatus 201 may give a predetermined notification to notify the user of a failure, or the like.

According to the technique of the present disclosure, parameters for calibrating an image capture apparatus having a plurality of optical systems can be determined without having to place a calibration pattern.

Other Embodiments

Embodiment(s) of the present disclosure can also be realized by a computer of a system or an apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., an application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., a central processing unit (CPU), or a micro processing unit (MPU)) and may include a network of separate computers or separate processors to read out and to execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), a digital versatile disc (DVD), or a Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

What is claimed is:

1. A processing apparatus for calibrating an image capture apparatus having a first optical system, a second optical system, and an image capture sensor, each of the first and second optical systems including a wide-angle lens next to each other, the processing apparatus comprising:

at least one processor; and a memory storing instructions that, when executed by the at least one processor, cause the processing apparatus to function as:

an obtainment unit configured to obtain a first image acquired by image capture based on a light beam passing through the first optical system using the image capture sensor, the first image including a part of the second optical system; and a determination unit configured to determine, based on an image of the second optical system included in the first image as an object and not based on an image captured by the second optical system, a first calibration parameter for calibrating the first optical system according to a deviation from a reference value related to the first optical system or the image capture sensor, wherein an angle of view of the wide-angle lens of the first optical system is an angle that provides the ability to capture at least part of the second optical system as the object.

2. The processing apparatus according to claim 1, wherein the determination unit performs modification on the first image according to a temporary parameter, calculates a similarity between the first image after the modification and a first template image representing an image of the second optical system, and determines the first calibration parameter based on the temporary parameter with which the similarity is equal to or above a threshold.

3. The processing apparatus according to claim 2, wherein the determination unit calculates the similarity using template matching.

4. The processing apparatus according to claim 2, wherein the determination unit performs distortion correction and the modification on the first image, and calculates the similarity between the first template image and the part of the second optical system in the first image after the distortion correction and the modification.

5. The processing apparatus according to claim 2, wherein the determination unit obtains the first template image corresponding to an image capture parameter used by the image capture apparatus in performing image capture to acquire the first image.

6. The processing apparatus according to claim 1, wherein, in performing image capture to acquire the first image, the image capture apparatus performs image capture using an image capture parameter adjusted to suit the second optical system, and the obtainment unit obtains the first image acquired by the image capture using the adjusted image capture parameter.

7. The processing apparatus according to claim 6, wherein the image capture apparatus performs an adjustment of the image capture parameter to suit the second optical system after performing image capture based on an instruction from a user, and performs the image capture to acquire the first image.

8. The processing apparatus according to claim 5, wherein the image capture parameter is at least one of a focal length and an f-number.

9. The processing apparatus according to claim 1, wherein the obtainment unit further obtains a second image acquired by image capture based on a light beam passing through the second optical system, and the determination unit further determines a second calibration parameter for calibrating the second optical system based on an image of the first optical system included in the second image.

10. The processing apparatus according to claim 9, wherein the determination unit determines the second calibration parameter by utilizing the first calibration parameter.

11. The processing apparatus according to claim 9, wherein the first calibration parameter includes at least parameters related to an optical axis and a roll rotation, and the second calibration parameter includes at least a parameter related to an optical axis.

12. The processing apparatus according to claim 1, wherein, in the image capture apparatus, the first optical system and the second optical system are situated so that part of the second optical system is included in a captured image based on a light beam passing through the first optical system.

13. The processing apparatus according to claim 1, wherein the wide-angle lens is a lens having an angle of view of 180° or above.

14. The processing apparatus according to claim 1, wherein the first calibration parameter is used to correct an image acquired by image capture by the image capture apparatus.

15. The processing apparatus according to claim 1, wherein the processing apparatus includes the image capture apparatus.

16. A processing method for calibrating an image capture apparatus having a first optical system, a second optical system, and an image capture sensor, each of the first and second optical systems including a wide-angle lens next to each other, the processing method comprising:

obtaining a first image acquired by image capture based on a light beam passing through the first optical system using the image capture sensor, the first image including a part of the second optical system; and determining, based on an image of the second optical system included in the first image as an object and not based on an image captured by the second optical system, a first calibration parameter for calibrating the first optical system according to a deviation from a reference value related to the first optical system or the image capture sensor, wherein an angle of view of the wide-angle lens of the first optical system is an angle that provides the ability to capture at least part of the second optical system as the object.

17. A non-transitory computer readable storage medium storing a program which causes a computer to perform a processing method for calibrating an image capture apparatus having a first optical system, a second optical system, and an image capture sensor, each of the first and second optical systems including a wide-angle lens next to each other, the processing method comprising:

obtaining a first image acquired by image capture based on a light beam passing through the first optical system using the image capture sensor, the first image including a part of the second optical system; and determining, based on an image of the second optical system included in the first image as an object and not based on an image captured by the second optical system, a first calibration parameter for calibrating the first optical system according to a deviation from a reference value related to the first optical system or the image capture sensor, wherein an angle of view of the wide-angle lens of the first optical system is an angle that provides the ability to capture at least part of the second optical system as the object.

\* \* \* \* \*